Patented May 11, 1926.

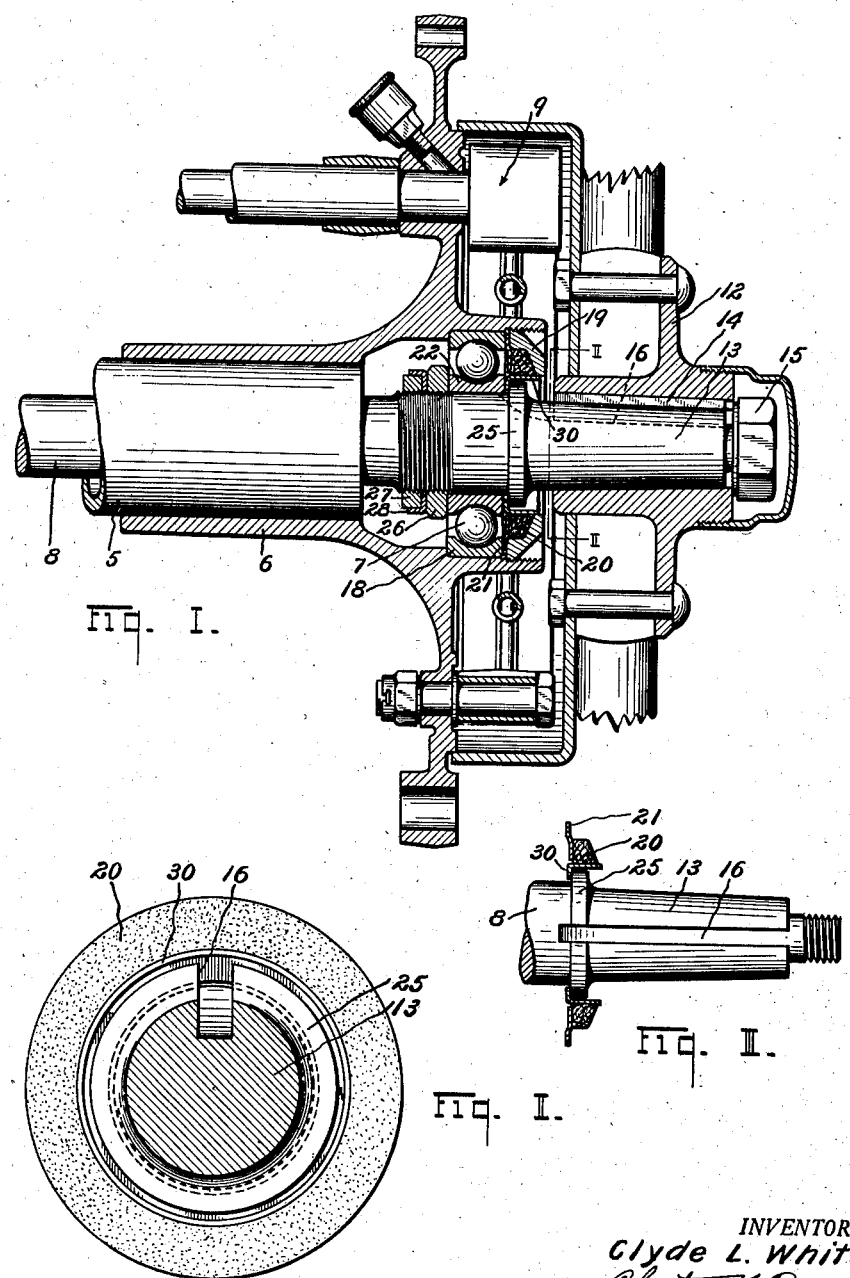

1,584,340

UNITED STATES PATENT OFFICE.

CLYDE L. WHITE, OF TOLEDO, OHIO, ASSIGNOR TO THE WILLYS-OVERLAND COMPANY, OF TOLEDO, OHIO, A CORPORATION OF OHIO.

OIL RETAINER.

Application filed September 2, 1922. Serial No. 585,841.

This invention relates to vehicles having rotatable wheel axles and has reference particularly to the oil retaining means for the wheel and axle bearing.

An object of the invention is to provide an improved means for retaining oil in and excluding dust from the wheel bearing while permitting the maximum strength in the axle carrying the wheel, the minimum distance between the plane of the wheel and the plane of the bearing and at the same time permitting the construction of the parts by the most economical methods. Other objects relating to details of construction and arrangement of parts will become apparent as I proceed with the detailed description to follow taken in connection with the accompanying drawing forming a part hereof, in which:

Figure I is a fragmentary sectional view of a vehicle axle casing together with the axle and wheel carried thereby:

Fig. II is a cross sectional view of the axle taken substantially on the line II—II of Fig. I showing the felt washer and retaining cup in elevation; and Fig. III is a fragmentary view of the end portion of the axle together with the felt washer and sleeve cooperating therewith.

The same reference numerals refer to corresponding parts throughout the figures.

The axle casing comprises in part a tubular member 5 and an end member 6, which carries the ball bearing 7 for the axle 8 and also carries the brake mechanism denoted as a whole by the reference number 9. The road wheel 12 having a hub with a tapered opening fits the tapered end 13 of the axle and is keyed thereto by the key 14, the nut 15 serving to draw the wheel up into firm engagement with the axle. Upon reference to Fig. I of the drawing it will be noted that the keyway in the axle is continued on through the flange 25 running out on a curve indicated by the dotted line 16 showing that it was made with a circular mill. The outer race member 18 of the ball bearing is seated in a chamfer in the end member 6 and is firmly clamped therein by a threaded ring or nut 19. A felt washer 20 fitting in an annular recess formed in the nut 19 is retained therein when the ring is in position by a thin ring 21. This ring as will be seen from Fig. I is clamped between the nut 19 and the outer bearing member and has its inner portion slightly offset to avoid contact with the inner race member 22.

The inner race member 22 is securely clamped between a flange 25 formed on the axle and nuts 26 and 27 separated by the retainer 28. To cooperate with the felt packing 20 in retaining the oil of the bearing and in excluding dust therefrom, I have provided a ring or cup shaped sleeve 30 the side wall of which makes rubbing contact with the inner face of the felt washer while the bottom wall is clamped between the axle flange 25 and the inner race member 22.

A well known desideratum in the construction of wheel mountings such as that described above, is to have a minimum space between the plane of the wheel and the plane of the bearing. The keyway in the tapered end of the shaft has accordingly been commonly made with an end mill so as to carry the keyway at its full depth as close as practical to the flange. This construction, however, has the disadvantage of producing a weak spot at the inner end of the key-way where stresses are localized due to the abrupt ending of the key-way. A further disadvantage from a manufacturing standpoint is the greater cost of an end mill operation over that performed with a circular mill. When the latter is used it becomes necessary either to greatly increase the distance between the plane of the road wheel and the plane of the bearing to permit the key-way to run out before reaching the flange on the axle or to continue the key-way through the flange. The latter, however, would leave a gap through which oil could escape, and the edge of the key-way would rapidly cut away the felt engaging the flange. By the construction disclosed herein all these disadvantages are overcome. The keyway can be cut with a circular mill and be continued through and as far beyond the flange as is necessary, thereby cheapening the cost and avoiding a weak spot; the flange itself may be made with the minimum thickness necessary to retain the inner bearing race; and the tapered portion of the shaft may be made with the minimum length to provide the necessary clearances. This construction has the further advantage of permitting the removal of the wheel without in any way disturbing the oil guard and dust excluder. It will be noted by reference to the drawing that while the road wheel and the bearing are arranged in close relationship, the cup sleeve carried by the axle and the felt washer against which it rubs are of adequate axial length to give the necessary contact area and may even overhang the flange on the axle.

While I have employed the term felt throughout the description and claims in referring to the washer 20, I desire this term to include not only a true felt but all other equivalent materials having similar oil retaining or dust excluding properties.

The tapered portion of the axle may, if desired, be made larger than that illustrated with its large end of the same diameter as the flange 25.

While I have shown and described in detail a particular structural embodiment as illustrative of my invention, I do not wish to be limited thereby, since various changes might be made therein without departing from the scope of the invention covered by the appended claims.

Having thus described my invention, what I claim as new and desire to secure by Letters Patent is:

1. In combination, an axle having a shoulder, a support therefor, a bearing between said support and said axle, a felt washer carried by said support, a cooperating sleeve encircling said shoulder and running upon the inner periphery of said washer, and means for clamping said sleeve against the side of said shoulder.

2. In combination, an axle having a shoulder thereon, a support for said axle, a bearing comprising inner and outer bearing members between said support and said axle, a felt washer carried by said support, and a sleeve encircling said shoulder and running upon the inner periphery of said washer and clamped between said shoulder and said inner bearing member.

3. In combination, an axle having a shoulder thereon, a support for said axle, an anti-friction bearing comprising inner and outer bearing members, a ring secured to said support having a felt washer seated therein, a cup shaped sleeve encircling said shoulder and engaging said washer, and means on said axle for firmly clamping said sleeve between said inner bearing member and said shoulder.

4. In combination, with an axle having a shoulder and a key-way formed therein and extending through said shoulder, a support for said axle, a bearing in said support for said axle, a felt washer carried by said support adjacent said bearing, and a ring clamped between said shoulder and a portion of said bearing to cover said key-way and contact with said felt washer.

5. In an axle having a tapered end portion and a flange at the inner end thereof, and a keyway cut through said tapered portion and said flange the combination of a support for said axle, an anti-friction bearing therein comprising an inner race member carried by said axle, a ring carried by said support, a felt washer seated in said ring, a cup-shaped sleeve slidably engaging said felt washer and extending over said flange, and means for clamping said inner race member and said sleeve together and against said flange.

6. In combination, with an axle having a tapered outer end portion and a flange at the inner end of said tapered portion, and a key-way therein extending through said tapered portion and said flange, a support for said axle, an anti-friction bearing for said axle comprising an outer race member and an inner race member, a ring threaded in said support for clamping thereto said outer race member, a felt washer seated in a recess in said ring, a cup-shaped sleeve cooperating with said felt washer and extending over said flange and a nut threaded on said axle for clamping said inner race member and said sleeve to said flange.

7. In combination, an axle having a shoulder thereon, a wheel rigidly secured upon the axle in spaced relation to said shoulder, a bearing mounted upon the axle inwardly of the shoulder, a ring having a vertical portion clamped between the bearing and shoulder and a laterally and outwardly projecting flange surrounding said shoulder, a flexible packing ring having its inner peripheral face seated upon the outer peripheral face of said flange, and means for holding said packing ring in position upon said flange.

8. In combination, an axle having a shoulder thereon, a wheel rigidly secured upon the axle in spaced relation to said shoulder, a bearing mounted upon the axle inwardly of the shoulder, a ring having a vertical portion clamped between the bearing and shoulder and a laterally and outwardly projecting flange surrounding said shoulder, a flexible packing ring having its inner peripheral face seated upon the outer peripheral face of said flange, a vertically disposed ring held by the bearing and adapted to engage said packing ring to prevent longitudinal movement of the latter, and means for holding said packing ring in engagement with said vertically disposed ring.

9. In combination, an axle having a shoulder thereon, a wheel rigidly secured upon the axle in spaced relation to said shoulder, a bearing mounted upon the axle inwardly of the shoulder, a ring having a vertical portion clamped between the bearing and shoulder and a laterally and outwardly projecting flange surrounding said shoulder, a flexible packing ring having its inner peripheral face seated upon the outer peripheral face of said flange, a vertically disposed ring seated upon the bearing and adapted to engage said packing ring to prevent longitudinal movement of the latter, and a clamping ring for holding said packing ring in engagement with said vertically disposed ring.

10. In combination, an axle having a shoulder thereon, a wheel rigidly secured upon the axle in spaced relation to said shoulder, a bearing mounted upon the axle inwardly of the shoulder, a vertically disposed ring seated upon the outer face of the bearing, a ring having a vertical portion clamped between the bearing and shoulder and a laterally and outwardly projecting flange surrounding said shoulder, a flexible packing ring having its inner peripheral face seated upon the outer peripheral face of said flange, and a hollow clamping ring securing said vertically disposed ring and containing said packing ring.

11. In combinatoin, an axle having a shoulder thereon, a wheel rigidly connected with the outer end of said axle, a housing for the axle having a lubricant holding chamber, a bearing mounted upon the axle inwardly of said shoulder and within said chamber, a ring having a vertical portion clamped between the bearing and said shoulder and provided with a laterally and outwardly projecting flange surrounding said shoulder, a packing member disposed upon the outer peripheral face of said laterally projecting flange and cooperating with said ring to prevent the escape of lubricant outwardly from said housing, and means for holding the packing member against displacement.

In testimony whereof, I affix my signature.

CLYDE L. WHITE.